United States Patent [19]
Tutiya

[11] 3,851,540
[45] Dec. 3, 1974

[54] PERPENDICULARLY MESHING SPUR GEARING

[75] Inventor: Hidetaka Tutiya, Tokyo, Japan

[73] Assignee: Citizen Watch Co., Ltd., Tokyo, Japan

[22] Filed: June 22, 1973

[21] Appl. No.: 372,572

[30] Foreign Application Priority Data
June 24, 1972 Japan.................................. 47-75019

[52] U.S. Cl..................................... 74/437, 74/462
[51] Int. Cl...................... F16h 55/04, F16h 55/06
[58] Field of Search............................... 74/437, 462

[56] References Cited
UNITED STATES PATENTS
2,436,231    2/1948    Schellens...................... 74/462 UX
3,701,287   10/1972   Kuiken................................ 74/462

Primary Examiner—Leonard H. Gerin
Attorney, Agent, or Firm—Sughrue, Rothwell, Mion, Zinn & Macpeak

[57] ABSTRACT

The perpendicularly meshing spur gearing is especially adapted for use between the winding pinion and the crown wheel of a timepiece and is characterized by a single projecting in the addendum of each tooth and an undercut on the same side of the tooth in the dedendum of each tooth. The projections are in the plane of each gear and are maintained in engagement during the whole engaging period of the related gear tooth.

3 Claims, 5 Drawing Figures 3,851,540

PERPENDICULARLY MESHING SPUR GEARING

BACKGROUND OF THE INVENTION

This invention relates to improvements in and relating to a mutually perpendicularly meshing spur gearing, especially adapted for use as the meshing parts between the winding pinion and the crown wheel in a timepiece.

In the timepiece, there are numerous gears, the tooth form of which are generally of arc, cycloid or involute. This principle is generally applicable to the mutually perpendicularly engaging gearing parts of the winding pinion and the crown wheel of the timepiece.

It is a requisite requirement for the meshing gear parts of the winding pinion and the crown wheel to establish a deep enough meshing relationship, so as to transmit a rather heavy winding torque.

In the case of mutually perpendicularly meshing spur gearing of the above kind, when the tooth form is of the conventional type as above referred to, the engaging contact between the mating gears are substantially taken over by edge portions of the mating teeth. Axially repulsing forces are generated at the mating gears and thus, they are subjected to inclining forces. At the same time, the mating gears are subjected to appreciable amounts of reaction which are directed in the main planes of the gears which are urged physically to separate from each other, injuring their mutual optimum engaging condition. In addition, the holding and bearing members for the mating gears are naturally subjected to appreciable deflection.

Conventional counter measures for obviating these drawbacks reside generally in the strengthening the holding and bearing parts for the mating gears.

A further drawback resides in severe wearing at the mating parts of the gearing. The worn-out fine metal particles may interfere with smooth meshing of various gearings provided in the timepiece, by invading into the various gear meshing areas.

The main object of the present invention is to provide a substantially improved spur gearing which is substantially devoid of the aforementioned disturbing forces.

A further object is to provide a spur gearing of the above kind which can operate with least possible wearing.

BRIEF SUMMARY OF THE INVENTION

The invention resides for fulfilment of the aforementioned various objects, in a transmission gearing comprising two mutually perpendicularly engaging spur gears, each tooth of at least one gear of said gearing having a rounded and circumferentially projecting motion-transmitting projection positioned in its pseudoaddendum range and directing towards its mating gear, said projection being kept in contact therewith substantially during the whole engaging period of the related gear tooth. The said tooth may preferably be formed with an undercut beginning from the root portion of said projection and extending through the pseudodedendum range of the gear tooth to the root circle.

The above and other objects and features of the invention will appear more fully hereinafter from a consideration of the following detailed description taken in connection with the accompanying drawings wherein a preferred embodiment of the invention is illustrated by way of example.

Figure 1:
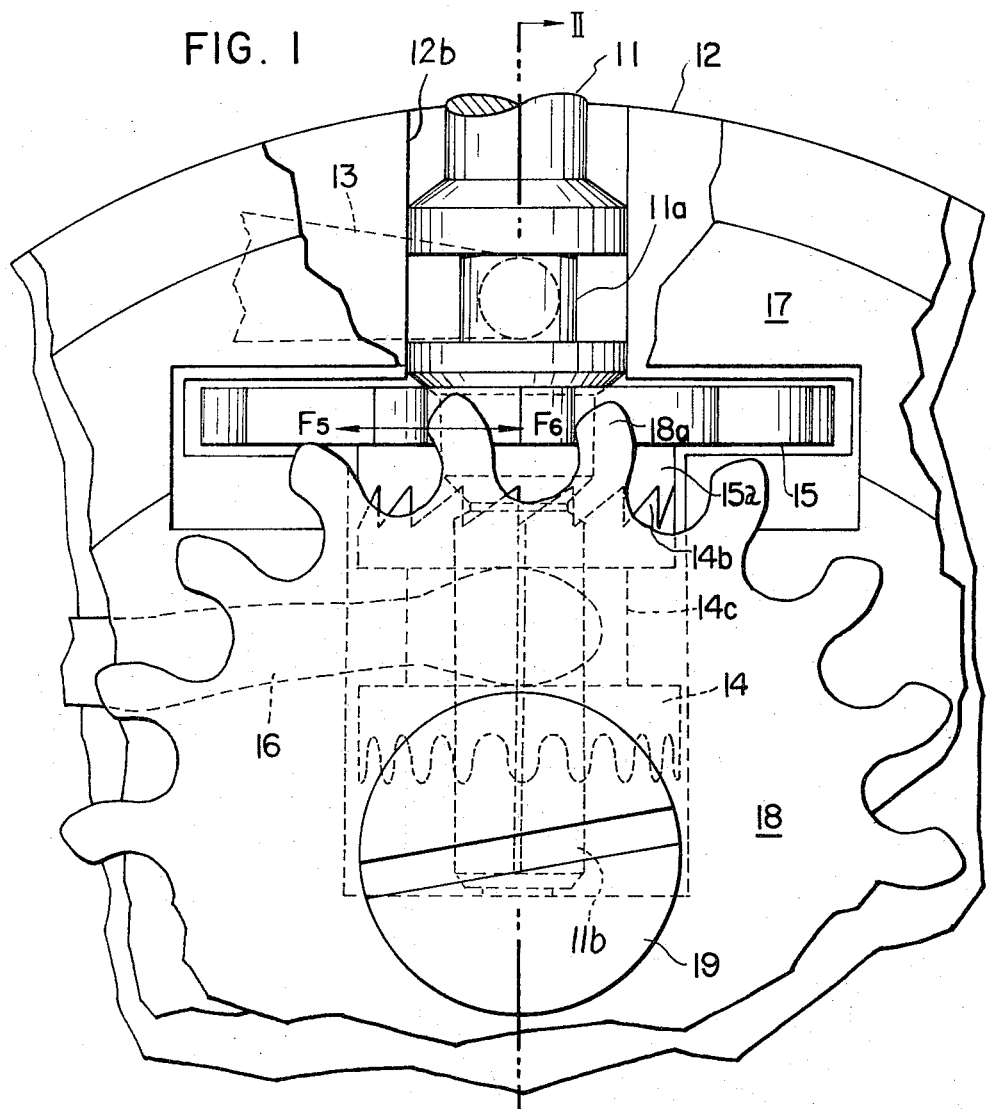
FIG. 1 is a rear side plan view of essential part of a watch embodying the principles of the invention, showing a close proximity part to the winding stem, several parts being broken away for demonstrating inner working parts and certain parts being shown only partially for simplicity.
Figure 2:
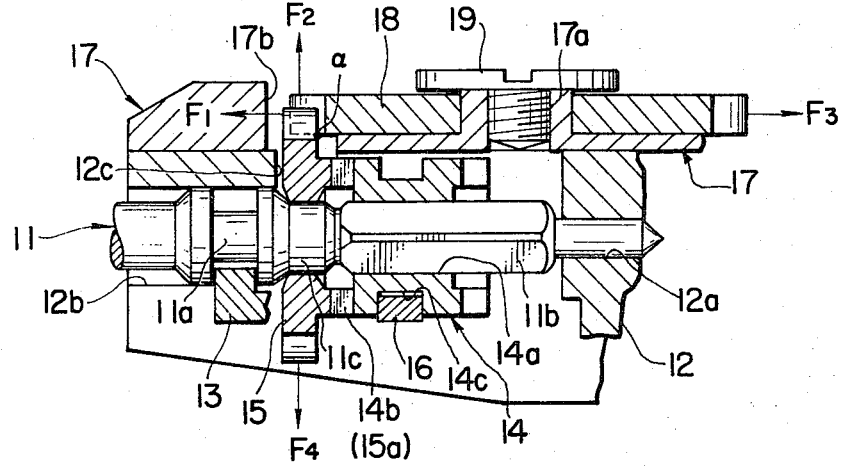
FIG. 2 is a sectional view taken along the section line II—II in FIG. 1 and in a reduced scale relative thereto.

In FIGS. 1 and 2, illustrative of the manipulating portion of a watch embodying the principles of the present invention, numeral 11 represents a winding stem which is held in a radial bore formed within the material of a pillar plate 12, only partially shown, said bore comprising a small diameter portion 12a and a large diameter portion 12b. The stem 11 is formed with a ring groove 11a with which a conventional setting lever 13, only partially shown, is kept in engagement, for positioning the axially slidable stem, as conventionally.

The stem 11 comprises a square cross-sectioned first portion 11b and a cylindrical cross-sectioned second portion 11c. A clutch wheel 14, having a square central bore 14a, is slidably mounted on the said first stem portion 11b, while a winding pinion 15 is mounted on the said second stem portion 11c. Clutch wheel 14 and winding pinion 15 are formed with mutually engageable clutch teeth 14b and 15a, respectively. Clutch wheel 14 is formed with a ring groove 14c which which a conventional clutch lever 16, only partially shown, is kept in engagement, for allowing the clutch wheel to slide relative to the stem 11 for clutching or declutching the both wheels 14 and 15.

A bridge 17, shown only in its section in FIG. 2, is fixedly mounted on the plate 12 by means of screw means, not shown, said bridge having a boss 17a on which a conventional crown wheel 18 is rotatably mounted. A headed screw 19 is threaded into said boss 17a for holding the crown wheel 18 in position.

As clearly seen from FIGS. 1 and 2, the wheels 15 and 18 are arranged at right angles precisely or substantially to each other, so far as their mutual gear meshing is concerned. These wheels 15 and 18 have spur gear-like teeth in spite of their mutually perpendicular gear meshing. The present invention provides optimal gear tooth configuration highly adapted for such gear meshing, as may be well supposed at a glance of FIGS. 1, 3, 4 and 5.

By turning the stem 11 manually in either direction, clutch wheel 14 will be turned in unison therewith. When the clutch wheel rotates clockwise when seen from left side of FIG. 2, the mutually engaging gear teeth 14b; 15a on the both wheels 14; 15 will generate mutually an axially repulsive force, thereby the clutch wheel 14 together with clutch lever 16 being forcibly shifted rightwards in FIG. 2 and the clutch teeth 14b; 15b making mutual slip.

On the contrary, when the clutch wheel 14 revolves clockwise when seen from right-hand side in FIG. 2, the both wheels 14; 15 will perform a unitary revolution on account of the established positive and driving mesh between the clutch teeth 14b and 15a. Rotation will be transmitted from the clutch wheel 14 to crown wheel 18 which drives a winding wheel, not shown, for performing a barrel-winding job, as commonly known per se.

The torque necessary for the execution of barrel winding is rather large. As an example, a torque in the order of 40 grcin is necessary when measured at the position of the winding pinion 15.

With use of the crown wheel and winding pinion having gear teeth of conventional arc-shaped or the like configuration, it has been found that the portion of period wherein substantial point contact between the mating teeth is maintained occupies a substantial part of the whole engaging period relative to the mating teeth. During this stage, the winding pinion 15 receives repulsive reaction forces $F_1$ and $F_4$ of substantial amount from the mating crown wheel 18, as shown schematically by respective arrows. When turning to the crown wheel 18, it is subjected to acting forces $F_2$ and $F_3$ from the winding pinion 15. In this way, crown wheel 18 is caused to incline from its ideally meshing position, thereby causing variations in the gear meshing depth.

Conventional counter measures against this drawback were various. As an example, walls 12c and 17b of pillar plate 12 and bridge 17 were specifically designed and arranged for the prevention of the winding pinion 15 from being inclined. As a further example, the head portion of set screw 19 for crown wheel 18 was enlarged for the prevention of excess inclination of the latter.

But, when the pillar plate and/or the bridge is/are of thin thickness, or when the set screws as at 19 could not be enlarged on account of the arrangement of automatic winding weight mass, the aforementioned counter measures can not be adopted to a satisfying degree. Further, when the stem-holding means are rather of delicate design providing only a limited stem-holding force, or when the crown wheel is mounted on a lever or the like member, the influence of the forces as at $F_3$ and $F_4$ acting in the respective main gear planes must naturally be taken into account as substantial disturbing factors to the realization of the ideal and durable gear meshing under consideration.

The essence of the improvements of the gear tooth configuration recommended in and by the present invention resides in the provision of a slightly rounded pronged projections 15b; 18a on each of the gear teeth of the gears, serving for the motion-transmitting contact with the mating tooth of the opposite and mating gear and in the provision of undercuts 15c; 18b on the dedendum of each gear tooth.

When the improved tooth configuration according to this invention is applied to the gear teeth of winding pinion and crown wheel, the mutually acting forces appearing at the engaging surfaces of the teeth of the mating gear wheels are directed substantially in the main gear planes and in the peripheral direction of the both wheels, as schematically shown by respective arrows $F_5$ and $F_6$. Thus, the problem of inclination of each gear, together with the holding force at the center of each gear may be eliminated.

Figure 3:
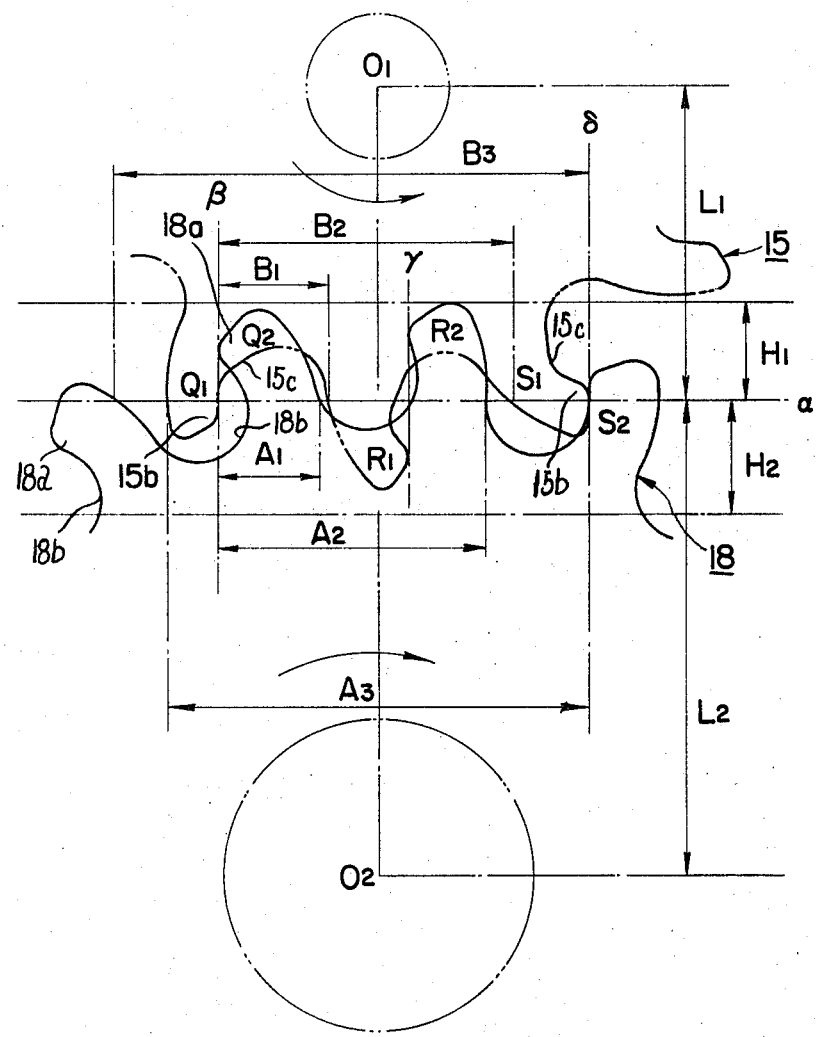
FIG. 3 is an illustrating schematic view of a part of a pair of mutually engaging gears constituting the inventive spur gearing, said gears being shown in their developed plan on a common plane for easy understanding of the invention.

Next referring to FIG. 3, the progress of driving and mating engagement between winding pinion 15 and crown wheel 18 will be described more specifically. FIG. 3 represents an imaginary figure wherein the gear main plane of winding pinion 15 has been rotated 90° around an imaginary line "alpha" which is a crossing line of the right-hand side surface of winding pinion 15 with the lower side surface of crown wheel 18 when seen in FIG. 2, or briefly between the inside side surfaces of the both wheels, so as to bring the said gear plan of the winding pinion on that of the wheel 18. The centers of rotation of these pinion and wheel 15; 18 are shown at $O_1$ and $O_2$, respectively. $H_1$ and $H_2$ represent the face widths measured on winding pinion 15 and crown wheel 18, respectively. Thus, the downwardly extending tooth part of winding pinion 15 from the line "alpha" and the upwardly extending tooth part of the crown wheel 18 above the same line "alpha" cooperate meshingly with each other, when seen in FIG. 3.

In fact, although FIG. 3 illustrates the gear meshing conditions between these pinion and wheel seen at a specific time point, this graphical representation may be deemed that it represents successive tooth engaging modes between the teeth $Q_1$ and $Q_2$ of the both gearing members 15 and 18, through the following coupling stages as at $R_1$ and $R_2$; and $S_1$ and $S_2$, respectively. Within the approaching region of these gear teeth $Q_1$ and $Q_2$, the tooth engagement will begin at a line "beta" between the both toothed wheels 15 and 18. The line "beta" represents a common tangent to the both prongs 15b and 18a. At the middle point of whole gear-meshing range, the tooth-meshing takes place on the line gamma. In this case also, the line "gamma" represents a common tangent of the same nature. Within the receding region, the tooth-meshing between $S_1$ and $S_2$ takes place at its final stage on the line "delta" which represents the similar common tangent of the above nature. The whole engaging period between the related and cooperating teeth of the both wheel members 15 and 18 may be defined by the horizontal space distance between the both imaginary lines "beta" and "delta."

As seen from the foregoing description, these both wheel members cooperate with each other through meshing contact by the both prong projections 15b and 18a.

In the following, several design conditions will be set forth.

1. The distances $L_1$ and $L_2$ defining the center-to-center distance between $O_1$ and $O_2$ are selected by consideration of other design factors of the timepiece.

2. The modules of the both wheel members 15 and 18 are selected by consideration of the degree of machinability, the strength of the mating teeth relative to the transmitting torque, and the like.

3. Next, the position and rounding radius of each of the prong projections 15b; 18a may be determined by consideration of the following conditions (see, FIG. 3).

$A_1 < B_1$
$A_2 < B_2$
$A_3 < B_3$

Figure 4:
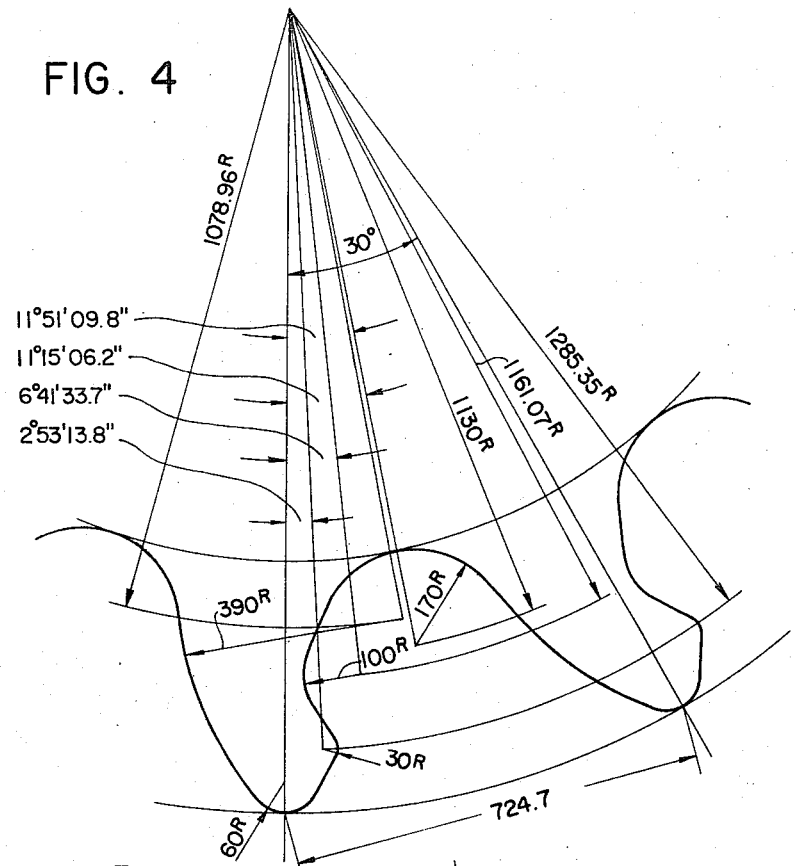
FIG. 4 is an enlarged plan view of a preferred embodiment of the tooth form of an improved winding pinion according to this invention.
Figure 5:
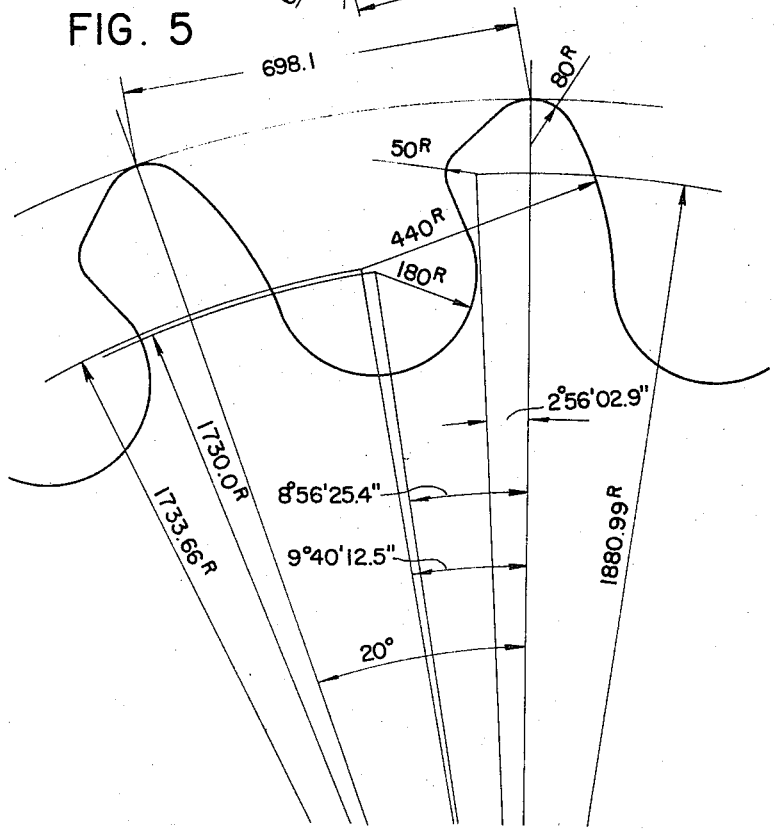
FIG. 5 is a similar view to FIG. 4, illustrative of a preferred embodiment of the tooth form of an improved crown wheel according to this invention and capable of meshing with the winding pinion shown in FIG. 4.

In FIGS. 4 and 5, each practical sample of the tooth forms of the both wheel members or winding pinion and crown wheel are representatively shown, under such assumption that $L_1 = 1,100$ microns; $L_2 = 1,700$ microns.

The machining of the winding pinion and the crown wheel can be performed by punching, milling, broaching or the like conventional technique.

The pseudoaddendum relative to the pinion 15 may be defined by the lower projecting part of each tooth on the pinion relative to the line "alpha," while the pseudodedendum of the pinion may be defined by the upper or remaining part of the same tooth in FIG. 3. Similar definitions may equally be considered relative to the mating wheel 18. These definitions may advantageously be adopted in resemblance to the commonly used sense of the addendum and dedendum of a gear, for the determination of the position and function of the aforementioned rounded prong projections 15b; 18a serving specifically for motion transmitting purpose in the peculiarly mating gear members as at 15 and 18.

The provision of undercuts 15c; 18b serves for avoiding otherwise possible interference in the gear-meshing.

The embodiments of the invention in which an exclusive property of privilege is claimed are as follows:

1. A transmission gearing comprising two mutually perpendicularly engaging spur gears, each tooth of at least one gear of said gearing having a rounded and locally projecting motion-transmitting projection positioned in its pseudoaddendum range within the tooth width of the mating gear during meshing and directed towards its mating gear, each of said projections being kept in contact with the related tooth of the mating gear substantially during the whole engaging period of the related gear teeth.

2. The transmission gearing of claim 1, wherein said tooth is formed with an undercut beginning from the root portion of said projection and extending through the pseudodedendum range of the gear tooth to the root circle.

3. The transmission gearing of claim 2 wherein the teeth on the mating gear having a configuration identical to the teeth on the other gear with the projections of related teeth engaging each other during meshing.

* * * * *